(No Model.)

A. HARRIS.
LOCOMOTIVE HEAD LIGHT.

No. 276,814. Patented May 1, 1883.

Witnesses
W. T. Cole
M. McGill

Inventor
Arthur Harris,
by Gt. H. W. T. Howard
Attys.

UNITED STATES PATENT OFFICE.

ARTHUR HARRIS, OF CHICAGO, ILLINOIS, ASSIGNOR TO J. McGREGOR ADAMS, OF SAME PLACE.

LOCOMOTIVE HEAD-LIGHT.

SPECIFICATION forming part of Letters Patent No. 276,814, dated May 1, 1883.

Application filed December 16, 1882. (No model.)

*To all whom it may concern:*

Be it known that I, ARTHUR HARRIS, a citizen of the United States of America, residing at Chicago, in the county of Cook and State of Illinois, have invented certain new and useful Improvements in Locomotive Head-Lights, of which the following is a specification, reference being had therein to the accompanying drawings.

This invention relates to improvements in devices for exhibiting signals on locomotive head-lights, and, briefly considered, it consists in transmitting light thrown forward by the main reflector through a transparent plate placed in the upper forward corner of each of the extended sides of the case, which plates may bear a number or other mark, and also in throwing light from the same source to a caution or danger signal placed below each of the above-named transparent plates, said caution or danger signals having a peculiar curvature or construction, which adapts them to receive and reflect the light throughout their entire interior area, whereby to cause the caution or danger signals to be clearly seen, whether viewed from the front or side of the engine or from a point in the rear.

Figure 1:
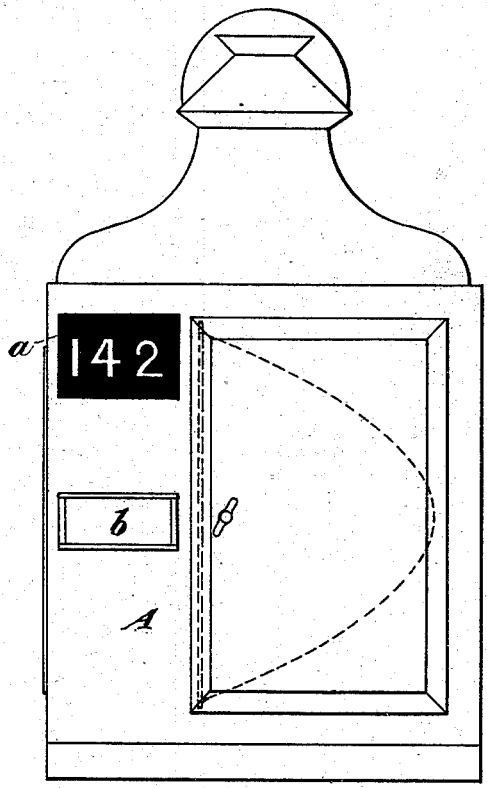
Figure 2:
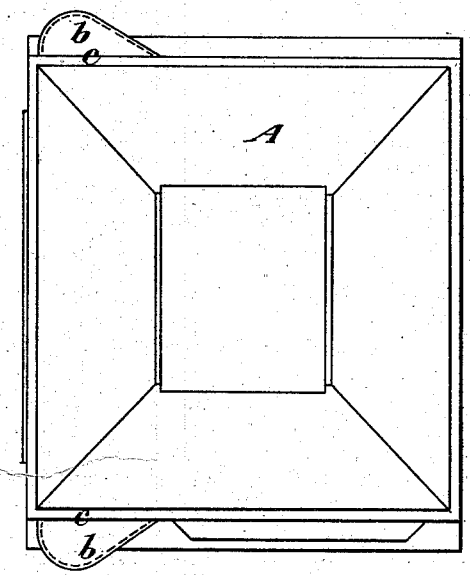

In the accompanying drawings, Figure 1 is a side view of my improved head-light. Fig. 2 is a top or plan view of the same.

Similar letters of reference indicate similar parts in both views.

A is the exterior case of the head-light or lantern. The rim commonly found at the front of a head-light case is omitted, and the whole front of the case is extended or projected forward a distance equal to the depth of the ordinary rim. Increased space or area is thus provided in the sides of the case for the display of the numbered transparent plates and caution-signals. At the upper and forward corner of each side of the case A is placed a transparent plate, *a*, practically in the plane of or flush with the side of the case, which plate bears a number or other mark to indicate the number or character of the train. Below each of the transparent plates *a* is a colored caution-signal glass, *b*, the inner side, *c*, of which is placed so as to join an opening cut in the side of the case. The glasses *b* are curved, or constructed so as to cause light received in one portion of the circle to be thrown to the opposite side, thus entirely filling the glasses with light and effectively illuminating their interior area. The opening or mouth of each of the glasses is greater or longer than the diameter of the circle. The glasses are of the same construction as those described in an application for Letters Patent filed November 28, 1882, by George M. Clark and Arthur Harris, and are not here claimed, except as elements in a combination of parts. The glasses may, however, have a corrugated outer surface.

Light from within the case A is thrown from the lamp by the main reflector through the openings in the case covered by the transparent plates *a*, and the number or mark placed on the plates is thereupon made clearly visible. Light is also thrown directly within the colored transparent or translucent signal-glasses B and reflected by their interior surfaces throughout their entire inner area. The colored lights are thus made visible from any point, whether at the front, side, or rear.

The plates *a*, as also the colored caution-signal glasses *b*, are made removable, so as to permit the interchange of numbers and colors.

I claim as my invention—

In a locomotive head-light, an outer case having its front extended, combined with a transparent signal-plate at the upper forward corner of each side of the case, and a concavo-convex transparent or translucent caution-signal glass below each of said plates, said signal-glasses having each an open inner side wider than the greatest diameter of its circular part and communicating with a perforation in a side of the exterior case, substantially as set forth.

In testimony whereof I affix my signature in presence of two witnesses.

ARTHUR HARRIS.

Witnesses:
L. A. GRAY,
P. C. ACKERMAN.